United States Patent
Etayo Garralda et al.

(10) Patent No.: US 7,556,800 B2
(45) Date of Patent: Jul. 7, 2009

(54) UNIVERSAL FISHING BAIT BASED ON FILAMENTS OR STRIPS OF FIBROUS COLLAGEN

(75) Inventors: Vicente Etayo Garralda, Pamplona (ES); Ion Inaki Garcia Martinez, Pamplona (ES)

(73) Assignee: Viscofan, S.A, Pamplona (ES)

( * ) Notice: Subject to any disclaimer, the term of this patent is extended or adjusted under 35 U.S.C. 154(b) by 630 days.

(21) Appl. No.: 10/888,374

(22) Filed: Jul. 9, 2004

(65) Prior Publication Data

US 2006/0008444 A1  Jan. 12, 2006

(51) Int. Cl.
*A01N 25/00* (2006.01)
(52) U.S. Cl. .......................... 424/84; 424/400; 530/840
(58) Field of Classification Search .................. None
See application file for complete search history.

(56) References Cited

U.S. PATENT DOCUMENTS 3,851,082 A * 11/1974 Whitmore et al. ........... 426/574
3,876,803 A * 4/1975 Stephan et al. ................. 426/1
4,362,748 A * 12/1982 Cox ................................ 426/1
5,197,219 A * 3/1993 Cook et al. ..................... 43/42
2003/0059463 A1* 3/2003 Lahtinen ..................... 424/450
2005/0136112 A1* 6/2005 Gonzales et al. ............ 424/473

FOREIGN PATENT DOCUMENTS

EP  0235101  * 9/1987

* cited by examiner

*Primary Examiner*—Neil Levy
(74) *Attorney, Agent, or Firm*—Notaro & Michalos P.C.

(57) ABSTRACT

The current invention involves a universal fishing bait fundamentally comprised of a cord body of filaments or strips of fibrous collagen made up into any shape or design capable of attracting fish, that is 100% biodegradable and that furthermore has a good capacity to diffuse and liberate attractant substances. The bait invented presents excellent mechanical properties in terms of resistance to breakage and resistance to tearing, is easily manipulated, transported and stored. Similarly, the invention provides for the use of fibrous collagen in the preparation of said universal fishing bait.

9 Claims, 1 Drawing Sheet

UNIVERSAL FISHING BAIT BASED ON FILAMENTS OR STRIPS OF FIBROUS COLLAGEN

FIELD OF THE INVENTION

The present invention belongs to the field of fishing baits used in diverse types of fishing, principally sports fishing both marine and freshwater. More specifically, it refers to an artificial fishing bait based on filaments or strips of collagen that are 100% biodegradable and that imitate the form of the natural prey of the fish, their organotypic qualities and their movements. The bait offers optimal mechanical properties and is easy to manipulate, transport and store.

BACKGROUND TO THE INVENTION

The diverse fishing arts, principally those dedicated to sports fishing, both marine and freshwater, use a wide variety of lures with hooks whose form or characteristics are aimed at attracting the attention of the fish and other prey. Many of these lures aim to imitate not only the form of the usual prey of the fish but also their organoleptic qualities and even their movements. To achieve this, the angler must provoke the movement of the lure, either by propelling it through the air and actively recovering the line to which it is attached in the water, using for example a fishing reel; or by dragging the bait through the water propelled by a aquatic vehicle that tows the line, an art known as trolling fishing or "curricán fishing", or a combination of both. In both cases, and in more importantly in trolling, the dragging of the lure provokes a lot of friction between the lure and the water, which augments with the speed, such that the bait must show a strong resistance to traction so that it doesn't disintegrate.

In some cases, the lure is composed of elements made from stiff materials, with or without articulations, with a certain capacity to navigate beneath the water. This navigation is based on the dynamics provoked by the counter-current forces generated in dragging the bait, which creates a motion, be it rotary ("spinning"), snaking, wavy, vibrant or erratic of such lures. These elements can be endowed with reflecting or coloured surfaces, and can even be made to fluoresce, making them more striking to the fish and in this way increasing their attraction. In other cases, the most commonly used in marine sports fishing, the lures are composed of flexible elements, being made of soft and/or elastic materials that as well as moving freely against the current, can also recreate the movements described above. These lures, usually completely or partially imitate, with great precision, the form of many vertebrate and invertebrate aquatic animals, common prey of the majority of the sports fish. Furthermore, colours and other types of attractants for the fish can be incorporated, such as stimulant chemical substances, natural or synthetic, related to the organic systems of the common prey or to the sensory systems of the predators. The stability of the bait in the water is fundamental when it is to be used as a lure with a hook, given that dragging the bait might lead to its dispersion, dissolution or disintegration, thereby losing its shape and/or its attractive properties. The bites of the fish as they pick at the bait, as well as the struggle that develops during the capture can easily break or unhook the bait.

The aim of producing these artificial lures is to substitute many of the natural baits, such as insects, worms, molluscs, crustacea, fish and other animals, used both in commercial and sports fishing, and whose availability not only depends on their prior capture, but whose quality is also heterogeneous. These natural baits may also be found intermittently depending on the seasons, as well a being conditioned by specific extrinsic factors such as the climate, which can make the effort and the cost of obtaining them extraordinarily high. These factors critically influence in the returns from commercial fishing of different species, as well as in the market value of a catch and in an important manner in the costs of this sporting activity.

The development of baits and artificial lures has been the subject of numerous patents, that have dealt with aspects such as: the production of baits using natural and/or synthetic materials; the shape, colour and the dynamic designs; the hormone additives, tastes and scents as attractants; the form in which these are integrated into the lure (encapsulated, dissolved, embedded, as a coating, etc.), as well as the form of combining natural and artificial elements in the same lure that is capable of imitating the effects of the baits used, for example in commercial fishing.

The use of collagen to produce baits and lures was proposed in a copending patent application of Etayo, V. & García, I.; (2004), that is being processed with the present application, in which it is claimed the use of fibrous collagen from any animal source to manufacture baits by molding and coagulating hydrated fibrous pastes, to form stable gels in diverse animal shapes, that can be subsequently dehydrated. These gels possess physico-chemical and mechanical properties that permit them to be used as baits attracting the fish, either due to its composition, its shape or due to its capacity to chemically fix attractants, both when fishing with a hook and rod or in any type of fishing where a bait is used.

On rare occasions, the use of sausage skins or casings of collagen have been reported as a container for other agglutinated substances in pastes or gels that constitute the bait; for example the elaboration of fishing baits using a cured collagen sausage skin, dried and perforated has been described, as in the patent by P. Morton, (U.S. Pat. No. 5,216,829, 1993), with the goal of stuffing in this a mass of ground scraps of meat, in this way achieving the slow liberation of the molecules and scents that come from them; similarly, the patent of Teepak U.S. Pat. No. 5,281,425 (K. V. Stribling, 25 Jan. 1994) should be mentioned, in which a mass of meat scraps from the boning of poultry, pork or beef, are stuffed into a skin of collagen, dried and cured to make sausages, that are subsequently sliced and sealed, making a bait that stimulates the scent of marine crustaceans.

As such, there is still a need to provide state of the art alternative bait to confront the problem of the scarcity, variability, cost, and availability of baits for commercial fishing that greatly conditions the economics of this activity. The proposed solution set forth by the present invention consists in providing a universal bait based on fibrous collagen that can substitute the usual baits without generating environmental risks and that furthermore, has a good capacity of diffusion and liberation of attractant substances, has excellent mechanical properties, principally in its resistance to breakage and tearing, that is easily manipulated, transported and stored.

OBJECT OF THE INVENTION

The present invention therefore, aims to serve as a universal fishing bait comprised fundamentally of a cord body of filaments or strips of fibrous collagen, here referred to collectively as filaments of fibrous collagen, shaped into a predetermined form or design, that can be used both in the commercial marine fishing, as in marine or freshwater recreational fishing.

Another object of the invention is to provide a bait that is easily stored, on a reel and that can be cut and segmented into wormlike pieces of varying length for their immediate use in situ.

A further object was that the invention should be 100% biodegradable over a short time span once abandoned in the environment without liberating any environmental noxious substance during the process.

It was also an object of this invention to create a bait that were innocuous for humans or the animals that might ingest it, and that it can be digested by fish and other animals given that its composition is basically protein.

Another object of the invention is to produce a bait that combining the above characteristics and without the need to possess a spongy structure, should be capable of accommodating and fixing within its structure, diverse substances and molecules that attract the fish, and at the same time permitting the diffusion of these substances when the bait is in the water, allowing the selective use of such bait.

Another object of the invention is to produce a bait that, while combining the above characteristics, should be capable of becoming hydrated on contact with the water, and to simultaneously change its texture increasing its flexibility in order to become more dynamic and more appetising to the bite of the fish without losing its other mechanical properties at the same time, remaining stable during its use.

Another object of the invention is to produce a bait that, while combining the above characteristics should also, be resistant to traction, both lateral and longitudinal, and to tearing, enabling it to remain firmly attached to the hook. These properties mean that it will last longer after numerous casts and bites.

Finally, another object of the invention is to use fibrous collagen to prepare such an universal fishing bait comprised fundamentally of a cord body of filaments or strips of fibrous collagen.

DESCRIPTION OF THE PREFERRED EMBODIMENTS

It should be specified that, to all intents and purposes, in the present description of the invention, the terms "bait" and "lure" must be understood as the same thing, given that in both cases they must be capable of attracting, fooling and provoking the bite of a majority of fish.

Similarly, it should be understood that in the context of the present invention, the terms fibroid or fibrous refer without distinction and always, to those collagenous structures and molecular substructures that can be reconstituted, and that are formed prior to that resulting from the gelling process that is described below.

Figure 1:
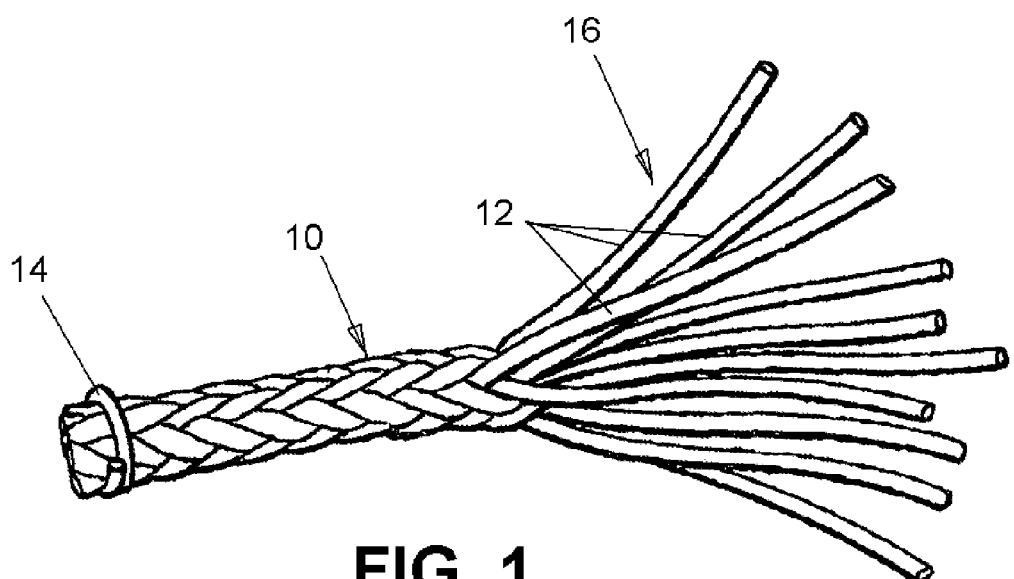
FIG. 1 illustrates a universal fishing bait comprised fundamentally of a cord body 10 of 12 plaited filaments 12 of fibrous collagen that have been clipped together at their proximal end at 14 and that has its distal half 16 unthreaded to simulate the tentacles of an aquatic animal.
Figure 2:
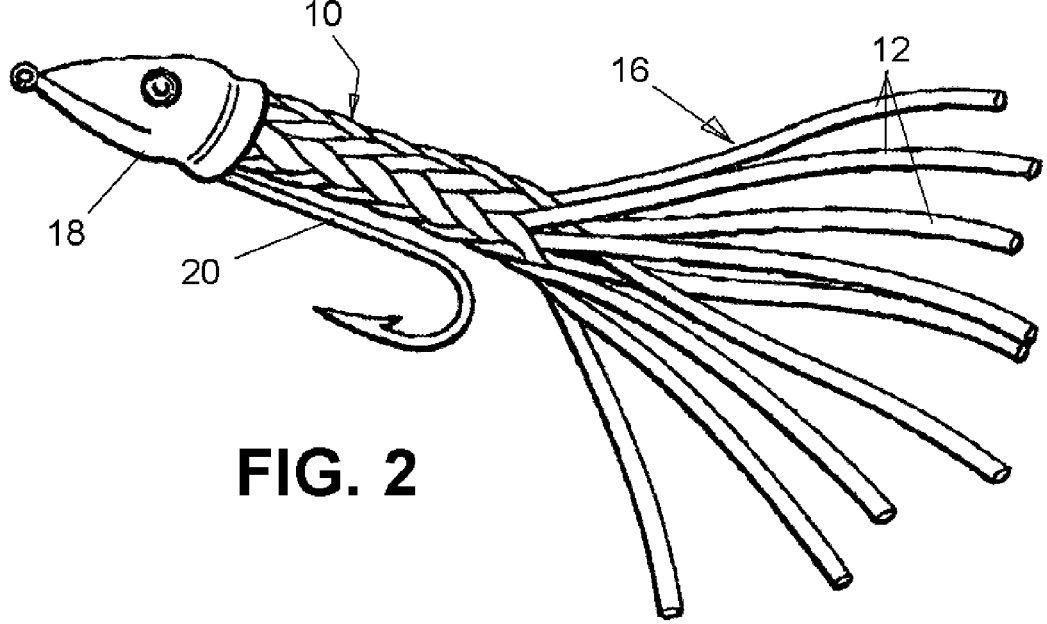
FIG. 2 illustrates a universal fishing bait comprised fundamentally of a cord body 10 of 12 plaited filaments 12 of fibrous collagen that have been clipped at the proximal end where a molded lead jig head 18 with a hook 20 has been placed. The present invention provides a universal fishing bait fundamentally comprised of filaments or strips of fibrous collagen made up in any shape or design capable of attracting fish.

In a particular manufacturing process of this invention, said filaments or strips of fibrous collagen are woven and/or plaited (here collectively referred to as intertwined) into any shape or design capable of attracting the fish, in particular into a cord body that is elongated with respect to the lengths of the filaments as shown in FIGS. 1 and 2.

The present invention refers to a bait or lure destined fundamentally to fishing with a hook, that is made up of a cord body with a cylindrical, pellet-shaped or polygonal cross-section, made by weaving and/or plaiting the various monofilaments and/or strips of fibrous collagen.

Likewise, the universal fishing bait fundamentally comprised of a cord body of filaments or strips of fibrous collagen that is the invention can also incorporate different fixed or mobile elements of diverse nature such as metals, synthetic polymers, natural polymers, wood or any other material.

In another particular embodiment of the invention, the collagen fibres in the filaments or strips have been orientated in a predetermined manner, in one or various directions, to improve the tensile strength in these directions. This spatial reorientation of the fibres enables the physicochemical and mechanical properties of the bait to be controlled, in particular contributing to the increment both of the tensile strength as to the tearing strength of the bait in these directions.

Said orientation of the collagen fibres in the filaments or the strips that make up the bait is produced during the manufacturing of the bait, specifically during the conformation thereof by extrusion, as will be described below.

The peptide nature of the collagen bait of the invention also permits the fixation, through chemical bonding of a wide diversity of molecules, such as amino acids, fats, other peptides, proteins, etc., that are olfactory or hormonal attractants for the fish. These substances have to be added as additives to those more specific types of baits, constituting a unique capacity of the bait, given that it confers organoleptic properties similar to those of the natural baits. On the other hand, the use of crosslinked substances favours the generation of the bonds that will be described below.

In another embodiment of the bait of the invention, the fibrous collagen is derived from any animal source, and could be native, partially hydrolysed or chemical modified.

In a preferred embodiment, the fibrous collagen is derived from vertebrate animals such as fish, amphibian, reptiles, birds or mammals, or from invertebrates such as coelentera, sponges, worms, tunicates, echinoderms or molluscs.

In an even more preferred embodiment, the fibrous collagen is extracted from skin, cartilage, bones, tendons or intestines of vertebrates such as fishes, amphibian, reptiles, birds or mammals.

It is known that native collagen is a fibrous scleroprotein, a basic component of the animal connective tissue, and of bones and tendons. It is formed by 19 amino acids, tryptophan being absent, and it ha a notably high glycine content (33%), as well as a high proline and hydroxyproline content (22%). This high concentration of proline, hydroxyproline and glycine, which constitute more that 50% of the amino acids, is characteristic of all types of collagen. These amino acids form a repetitive sequence, along with a third amino acid, that plays a fundamental role in the three-dimensional conformation of the precursor of collagen, the molecule tropocollagen. Five tropocollagen molecules group together, overlapping longitudinally over a ¼ of their length, to form a microfibre. The microfibres in turn are grouped in a tetragonal structure to form subfibres, and these assemble to form the fibroid collagen, that is the basic unit of the connective tissues ("Hierarchical Structure of Collagen Composite Systems". E. Baer, J. J. Cassidy and A. Hiltner. *Pure Appl. Chem.* 1991, 63(7), 961-973).

Through hydrolysis (acidic or basic) of the collagen, along with a thermal treatment, collagen can be converted by degradation into another substance called gelatin. In such a conversion it is necessary to break the hydrogen bonds that stabilise the triple helix, transforming it into the 'random configuration' typical of gelatin.

In this way, the collagen filaments or strips of the bait in this invention can exist as partially hydrolysed collagen, albeit in a form that can be reconstituted and recover the fibrous structure of native collagen.

Similarly, the collagen can be chemically modified collagen, for example as in succinylated, acylated, methylated or esterified collagen. The native collagen possesses abundant —$NH_2$ and —COOH groups in its structure, enabling it to undergo molecular chemical modifications through: the acylation of the amino group for example, in a reaction with a mixture of acetic anhydride and acid; or succinylation in a reaction with the succinyl anhydride. The carboxylic groups can be esterified in a reaction with water soluble aliphatic alcohol's such as methanol and ethanol. The use of chemically treated collagens endows the capacity, among other advantages, of obtaining more transparent masses (U.S. Pat. No. 3,530,037).

In a particular embodiment of the invention, the bait comprised fundamentally of a cord body of filaments or strips of fibrous collagen has the capacity to be hydrated and dehydrated in a reversible manner. That is to say that it is capable of swelling by the uptake of liquids when it enters into contact with water or with aqueous solutions, and change texture with the corresponding increase in its flexibility. Furthermore it can be dried and humidified with new aromas, recuperating its original form, enabling it to be adequately manipulated both when dry as well as when humid, and as such prolonging its use.

In another particular embodiment of the bait of the invention, the dry weight of the total protein, collagen and noncollagenous, is greater than 50% of the total dry weight of the filaments or strips of fibrous collagen of which it is composed.

In a particular embodiment of the bait invented, the filaments or strips of fibrous collagen comprise, as well as the fibrous collagen, one or various attractant substances.

Said substances have a attractive capacity for the fish and other prey through hormones or other sensory mechanisms. Surprisingly, it has been found, through a series of field tests, that the reconstituted fibrous collagen itself possesses a certain attractive capacity for a diversity of fish such as carps, barbs or black bass, and that does not need to be unmasked or reinforced by other substances. Nevertheless, the incorporation of such attractant substances can tremendously augment the potency of the bait or its activity as a lure, whose form, colour and texture also contribute to its efficiency.

In a particular embodiment, such attractant substances might be natural or synthetic, organic or inorganic, preferably proteins, and even more preferably blood proteins of vertebrate or invertebrate animals, L-amino acids, nucleotides, nucleosides, alcohol's, sugars, fats, or meat extracts, fish extracts or other aquatic organisms extracts.

In a preferred embodiment, said attractant substances are chemically crosslinked to the collagen molecules by the activity of crosslinking agents.

One of the great advantages of the bait fundamentally comprised of a cord body of filaments or strips of fibrous collagen is the surprising fact that it possesses the capacity to bind attractant molecules for the animals to which it is destined. Such molecules, once incorporated amongst the collagen dispersion, remain fixed through covalent chemical bonds that may be promoted by crosslinking agents, in the same way that as occurs with the elements that are crosslinked to the collagen fibres: acetal and hemi-acetal bonds between the hydroxyls of the protein and the aldehyde groups of some molecules; imino bonds (with the amine —$NH_2$ groups of the protein); sulphide bonds formed with the thiol groups of the non-collagenous proteins (—SH), etc.; or peptide bonds, as well as the non-covalent chemical bonds such as hydrogen bridges, ionic bonds, etc.

The molecules fixed to the collagen provide the bait with there own aroma. This signifies that the attractant can awaken the attention of the fish during a prolonged time period and that the bait will always conserve its own aroma or flavour. This implies another major advantage when it comes to the bite, given that after a first contact with the lure, the predator will not reject the bait, maintaining the bite until the hook has been taken.

In another specific embodiment of this invention, the bait also includes one or various colorant substances.

Such colorants might include diverse pigments, colorants or shiny particles, reflective or phosphorescent combinations in any shape or design.

In another specific embodiment of the bait of the invention, the colorants are selected from between organic or inorganic colorants, natural or artificial and preferably annato, iron and titanium oxides, cochineal carmine, squid ink, caramel, glitter, indigo, chlorophyll's, anthocyanin's, carotene's, turmeric or vegetable carbon.

In another particular embodiment of the bait of the invention, the filaments or strips of fibrous collagen also comprise one or more additives selected from between:
  crosslinking agents;
  other noncollagenous proteins;
  strengtheners;
  gelling agents;
  plasticising agents;
  lubricants;
  preservatives and antioxidants; and
  agents that modify the density.

In another particular embodiment, the crosslinking agents ared selected between aldehydes, preferably glyoxal, glutaraldehyde or formaldehyde; sugars; modified starches; diisocyanates aliphatic, aromatic or hydroaromatic, preferably hexamethylene diisocyanate; polyethyleneglycol diglycidyl ether; metal cations, preferably of aluminium or iron; oils and fats, preferably of polyunsaturated fatty acids; or tanning enzymes/proteins, preferably acyl transferases, transglutaminases (Ajinomoto, U.S. Pat. No. 5,968,568, 1999; Zymogenetics, WO97/40701 International Application 1997), lacase or bilirubin oxidase; diepoxides such as the 1,4 butanediol diglycil ether; and modified resins of melamine.

The use of crosslinking agents that promote chemical crosslinking bonds permit the fixation to the collagenous matrix of the noncollagenous molecules as well as the attractant substances. The term "crosslinking" should be understood, in the context of the present invention, as similar to that of a "crosslinker".

In another particular embodiment of the bait invented, the noncollagenous proteins can be selected from between proteins of animal origin, preferably keratine, elastin, milk serum, casein, albumin, fibrin, actin or myosin, and proteins of vegetable origin, preferably wheat gluten, zeine or globulins of leguminous seeds such as soya or peas.

Such proteins not only modify the properties of the bait to a degree, but they also act as attractant substances for the fish.

When the collagen is mixed with other proteins, the total dry weight of protein, collagenous and non-collagenous, must be greater than 50% of the total dry weight of the filament or strip, as indicated above. When various non-collagenous proteins are included they can be mixed among themselves in any proportion.

In another particular embodiment of the bait invented, the strengthening agents are selected from cellulose fibres; polysaccharides derived from chitin, preferably polymers of the nacetylglucosamine or chitosan; starches, preferably dialdehyde starch; synthetic resins, preferably hydrolysed polyvinylalcohol (PVA); esterified water soluble polysaccharides, preferably propylene glycol alginate (PGA) (Higgins 1978 U.S. Pat. No. 4,096,282).

Likewise, in some particular embodiment it is possible to use as reinforcing agents, filaments of cured collagen, cords or plaits of filaments of cured collagen, tissues or nets of cured collagen, or belts or films of cured collagen; vegetable fibres, preferably cotton, flax, hemp or abaca, in the form of woven or unwoven cloth; and the fibres may be joined with resins or viscose.

The use of said reinforcing agents permits the strengthening of the fibrous structure and/or will in general improve the physico-mechanical properties of the bait.

If vegetable fibres are used as reinforcing agents, these can form clothes or sheets, woven or unwoven, and the fibres can be free or joined between themselves by binding agents. This is the case of the fibres of cotton, flax, hemp, or abaca, which can be present in the form of cloth or paper sheets and where the fibres can be bound together with resins or viscose.

Should the reinforcing agents used be composed of cured collagen as highlighted above (filaments, laces or any type of plait of such lace filaments, woven or in nets, or also as tapes or films), the total dry weight of protein, collagenous and non-collagenous, must be greater than 50% of the total dry weight of the filament or strip.

In another particular embodiment of the invention, the gelling agents are selected from the group of cellulose ethers, preferably carboxymethyl cellulose, hidroxymethyl cellulose, hidroxypropyl cellulose or hidroxypropylmethyl cellulose; or of the group of hydrocolloids, preferably alginates (Easton 1986 U.S. Pat. No. 4,614,794), carrageenans, agar, furcellerans, chitosan, guar gum, locust bean/garrofin gum, gum arabic, gum tragacanth, gum karaya, gum gellan, xanthan gum, pectins, glucomannans (Maynard 1999 U.S. Pat. No. 5,962,053), or honey, coupled to promoters of gelling selected from the group of metal salts of group IIA, preferably beryllium, calcium or strontium, of group IIB, preferably zinc or cadmium, or of group IIIA, preferably aluminium. Said promoters of gelling are capable of provoking the gelling or complexing of some of the cited components to which they bind.

Said gelling compounds are hydrophilic compounds that contribute to the retention of water in the matrix, which prolongs the hydrated state of the bait and its fresh aspect, as well as improving the elasticity and other mechanical properties. In a preferred production process, said gelling agents were employed in a proportion of 0.1 to 25%, preferably of 2 to 10%, more preferably of 1.5 to 5.5% of the total dry weight of the filament or strip.

In another preferred embodiment of the invention, the plasticising agents are selected from polyhydric alcohols such as glycerol, sorbitol, sorbitan, mannitol, maltitol, propyleneglycol, ethyleneglycol, Panthenol, propylene glycolalginate, and polymeric sugars, saccharose, or maltose.

These edible and low molecular weight plasticising agents help in the dispersion of the proteins in the plastic mass and contribute to improve the mechanorheological properties of the bait. In another preferred production process, said plasticising agents are used in a proportion of 10 to 25% of the total dry weight of the filament or strip.

In another preferred embodiment of the invention, the lubricants are selected from fats; mono-, di- and triesters of the edible polyhydric alcohols; vegetable oils preferably hydrogenated; mineral oils; edible fatty acids; phospholipids, preferably lecithin; silicon oil and mucopolysaccharides.

The bait can contain small but effective quantities, in the order of 3 to the 6% of the total dry weight of the filament or strip, of a lubricant that proves to have a coadjuvant effect in the operation of molding and the demolding, or in the operation of extrusion. Additionally, these substances can perform the function of plasticisers as well as contributing to the attraction exerted by the bait.

In another embodiment of the bait of the invention, the preservatives and antioxidants are selected from between ascorbic acid, ascorbyl palmitate, sodium bisulphate, calcium propionate, sorbic acid, potassium sorbate, butylated hydroxyanisole (BHA), butylated hydroxytoluene (BHT), ethoxyquin, lactic acid, acetic acid, benzoic acid, sodium benzoate, ethyl-o-hydroxybenzoatr, methyl-p-hydroxybenzoate, propyl-p-hydroxybenzoate, spices and vegetable extracts.

The bait can incorporate preservatives and antioxidants to prolong its useful life, maintaining its properties and its fresh aspect.

In another particular embodiment of the bait invented, agents can be added that modify its density such as substances of a density less than 1, preferably fats and oils, or solutions of density greater that 1, preferably molasses.

The fats used in the bait invented such as attractants, crosslinkers, lubricants or modifiers of the density can be of animal, vegetable or mineral origin, and can be saturated fats, saturated or unsaturated oils, such as the mono-, di- and triesters of the edible polyhydric alcohols, or fatty acids. They can be used alone or mixed together in any proportion, in such a fashion that they constitute 2 to 15% of the total dry weight of the filament or strip.

Finally, another aspect of the invention, the use of fibrous collagen is provided to prepare a universal fishing bait fundamentally comprised of a cord body of filaments or strips of fibrous collagen made up into any shape or design capable of attracting fish.

As previously commented, the fibrous collagen is recovered from natural sources (skin, tendons, intestines, etc.) through a variety of known methods used for this purpose. Afterwards, it is dissolved in aqueous acidic or basic solutions to which are optionally added, one or more additives such as for example, crosslinking substances, attractant substances or colorants, forming in this process a hydrated paste. Using this precursor paste of fibrous collagen and through known industrial processes that are based on techniques that involve extrusion, chemical coagulation, thermal hardening and drying, flat or round strips or filaments are obtained with a solid content that oscillates between 40 to 95%, collagen being the major ingredient representing more than 50% of the total solids. These filaments and strips of protein have a good resistance to traction, due to the crosslinking of the distinct fibrillate collagen subunits, due among other factors to the chemical activity of substances known as crosslinkers and/or to physico-chemical treatments, such as heat treatment, that hardens or cures these filaments or strips.

To date, numerous patents have described methods to form strips or films, flat or tubular, of collagen filaments from diverse animal sources (none of any of these form part of the invention object that is presented here) such as the following: U.S. Pat. No. 3,928,651, U.S. Pat. No. 4,533,358, EP 0,143, 512, JP 1,174,338, JP 4,121,149, JP 6,205,648, WO 99/48375.

In general, such monofilaments and/or strips of fibrous reconstituted and cured collagen are manufactured by any of the known techniques that, in the case of the favoured procedures are: the direct extrusion of a collagen filament that is submitted to a posterior tanning and drying; or the extrusion of a strip or flat film of collagen that is subsequently submitted to torsion until it forms a filament; the extrusion of a strip or tubular film of collagen that is later opened longitudinally and twisted until it forms a filament that is, submitted previously or afterwards to a process similar to that of curing or tanning.

In this way, said monofilaments and/or strips of fibrous reconstituted and cured collagen can be obtained through the treatment of the intestines of sacrificed animals, from which many such these filaments can be plaited and/or woven together in order to make up a cord body of diverse thickness.

To construct the cord body woven and/or plaited, filaments or strips of fibrous collagen, it is preferred the use of monofilaments, strips or films of collagen such as those commercialised by the companies DevroTeepak or ViscofanNaturin, amongst others.

The diameter or cross-section of the monofilaments will be that required in function of the thickness and characteristics of the cord body that it is intended to produce, and in general it is between 1 and 3 mm. The design of the cord body, that is the type of weaving, is as varied as the capacity of the plaiting machines in use in the textile industry are capable of producing. In the field of mechanical looms for textile use, to give an example, we can mention those produced by the firm Ratera S.A. (Manresa, Barcelona, SP.), Trenz-Export (Manresa, Barcelona, SP.).

The examples that are described below serve to illustrate the invention, without implying any restriction in its possibilitie

EXAMPLE 1

Starting from 12 monofilaments of "costring" from the firm NATURIN GmbH Weinheim DE, that were woven in a machine designed to produce sports strings (Spiroide 12/154 of Ratera S.A., 08240 Manresa, Barcelona).

A lure is subsequently prepared from a segment of the previous woven filaments that have been clipped at their proximal end and have been unwoven from the midpoint onwards to simulate the tentacles of an aquatic animal (FIG. 1).

Likewise, another lure can be prepared formed by a segment of that woven as above, that has been clipped at its proximal end where a lead head or jig has been placed with a hook and squid jig at its distal end (FIG. 2).

EXAMPLE 2

A favoured example is that of a cord body, of multiple filaments woven around a central monofilament that is not interwoven with the rest and that runs along the central longitudinal axis of the cord, in such a manner that it can be extracted by pulling at one of its ends. This operation permits a central longitudinal passage to be generated where the fishing line and/or a hook can be introduced as well as diverse elements or weights. To manufacture this type of cord body, a plaiting machine is used to wind fishing line strings model fishing 16/115 from Ratera 08240 Manresa (Barcelona).

What is claimed is:

1. Universal fishing bait consisting essentially of:
a cord body (10), the cord body consisting essentially of a plurality of filaments (12) of fibrous collagen containing a solid content of between 40 to 95%, the solid content consisting of collagen which represents more than 50% of the total solid content, the plurality of filaments (12) being intertwined with each other by plaiting or weaving to form the cord body (10) to be elongated with respect to a length of the filaments compared to a width of the filaments, the cord body having a diameter that is small compared to the length of the cord body; and
a least one additive that is chemically bonded to the collagen of the filaments and that is selected from the group consisting of: attractant substances for attracting fish; colorants; crosslinking agents; non-collagenous proteins; strengtheners; gelling agents; plasticising agents; lubricants; preservatives; antioxidants; and agents for modifying density of the filaments.

2. The bait according to claim 1, wherein the fibrous collagen is cured and is derived from any animal source, being native, partially hydrolysed or chemically modified collagen.

3. The bait according to claim 1, wherein the bait has the capacity to be hydrated and dehydrated in a reversible manner.

4. The bait according to claim 1, wherein the attractant substance is natural or synthetic, organic or inorganic, and is selected from proteins, L-amino acids, nucleotides, nucleosides, alcohol's, sugars, fats, and meat extracts from fish or other aquatic organisms.

5. The bait according to claim 1, wherein the attractant substance is chemically crosslinked to collagen molecules of the filaments through the action of crosslinking agents.

6. The bait according to claim 1, wherein said filaments are cured collagen including one or several colorants.

7. The bait according to claim 6, wherein the colorant is selected from the group consisting of: organic or inorganic colorants, natural or artificial, annato, iron and titanium oxides, cochineal carmine, squid ink, caramel, glitter, indigo, chlorophyll's, anthocyanin's, carotenes, turmeric and vegetable carbon.

8. The bait according to claim 4, wherein the proteins are blood proteins from vertebrate or invertebrate animals.

9. The bait according to claim 1, wherein the dry weight of the total collagen and non-collagenous protein in the filaments is greater than 50% of the total weight of the filaments.

* * * * *